United States Patent [19]
King

[11] 3,958,360
[45] May 25, 1976

[54] SNARE TYPE ANIMAL TRAP

[76] Inventor: Lawrence Edward King, General Delivery, Clarkleigh, Manitoba, Canada

[22] Filed: June 30, 1975

[21] Appl. No.: 591,291

[30] Foreign Application Priority Data
July 26, 1974 Canada .............................. 205729

[52] U.S. Cl. ................................................ 43/87
[51] Int. Cl.² ..................................... A01M 23/34
[58] Field of Search ........................... 43/87, 15, 16

[56] References Cited
FOREIGN PATENTS OR APPLICATIONS
16,475   1891   United Kingdom ..................... 43/87

318,478   9/1929   United Kingdom ..................... 43/87

*Primary Examiner*—Warner H. Camp
*Attorney, Agent, or Firm*—Stanley G. Ade

[57] ABSTRACT

A spring loaded pivoted arm has one end of a snare wire secured to the upper end thereof and extending through a trigger mechanism situated at the upper end of a fixed arm so that when the snare is engaged, the trigger releases thus allowing the pivoted arm to snap away from the fixed arm and tighten the snare loop against the fixed arm thus ensuring a humane kill which is not always obtainable with conventional traps. The trigger release pressure is readily adjusted and in one embodiment, the spring action and setting action is facilitated by one end of the spring sliding along a retaining rod on the pivoted arm.

6 Claims, 7 Drawing Figures

SNARE TYPE ANIMAL TRAP

BACKGROUND OF THE INVENTION

This invention relates to new and useful improvements in animal traps. Conventional animal traps are either of the spring loaded jaw type or consist of a snare wire.

Jaw types are notoriously inhumane inasmuch as a kill is not ensured and snare traps also suffer from the same fault inasmuch as the tightening of the snare loop is dependent upon the force placed thereon by the animal caught therein.

Attempts have been made to combine the advantages of the snare type trap with a spring loaded mechansim to ensure that the snare loop is tightened as soon as the trap is sprung but these are relatively involved in construction and easily develop faults in operation particularly when used in extreme cold and snow conditions.

Furthermore such combination traps usually include a trigger mechanism which extends partly across the snare loop thus eliminating one of the principle advantages of the snare type trap namely unimpeded passage of the animal's head into the snare before the trap is sprung.

SUMMARY OF THE INVENTION

The present invention overcomes these disadvantages and provides a trap having the advantages of an open uimpeded snare loop and a spring operated device which ensures a rapid and humane kill. The trigger mechansim is actuated by a slight pull on the snare loop as soon as the animal's head is engaged therethrough and the setting tension is readily adjusted by the trapper when setting the traps.

The principal object and essence of the invention is therefore to provide a trap of the character herewithin described in which the snare loop is completely open and which includes spring means to close the snare loop rapidly as soon as the trigger mechanism is released.

Another object of the invention is to provide a device of the character herewithin described in which the released tension of the trigger mechanism may be adjusted within limits, when the trap is set.

A still further object of the invention is to provide a device of the character herewithin described which, in one embodiment, has a sliding spring attachment which facilitates the setting of the trap yet ensures full spring pressure being applied to the loop when the trap is sprung.

A yet further object of the invention is to provide a device of the character herewithin described in which conventional snare loops can be used and which can be readily attached and detached from the trap when desired.

A still further object of the invention is to provide a device of the character herewithin described which can be staked to the ground, rested against a tree, or held in position by means of packed snow depending upon the trapping conditions.

Still another object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
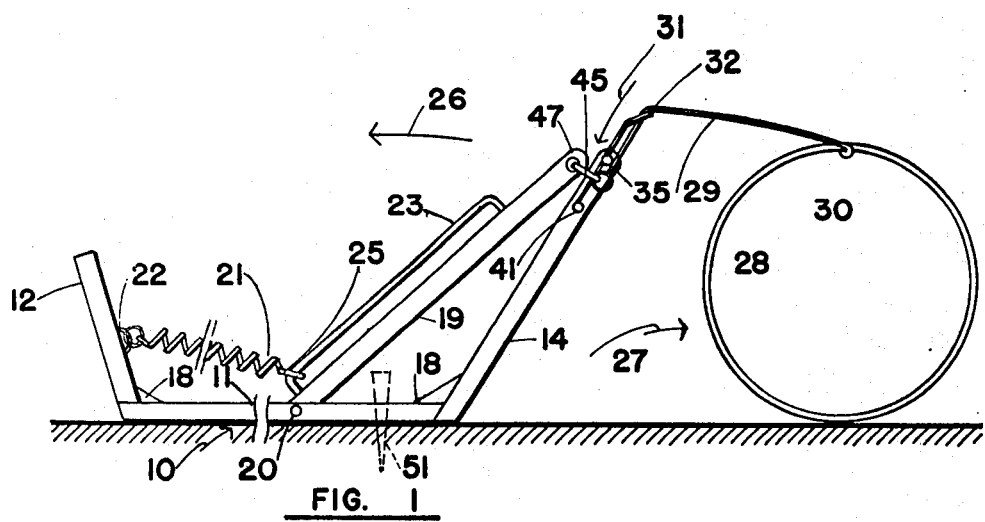
FIG. 1 is a side elevation of the preferred embodiment showing the trap in the set position.
Figure 2:
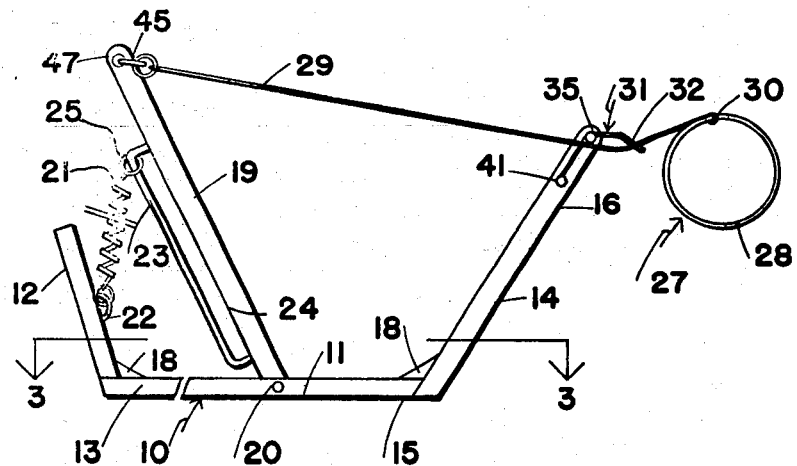
FIG. 2 is a view similar to FIG. 1 but showing the trap in the released position.
Figure 3:
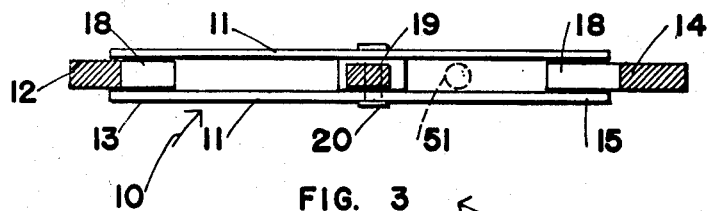
FIG. 3 is a fragmentary sectional view along the line 3—3 of FIG. 2.

Proceeding therefore to describe the invention in detail, reference should be made to the drawings in which 10 illustrates generally, a supporting frame consisting of a pair of spaced and parallel elongated strips 11 and having an anchor bar 12 welded between the ends 13 of the strips 11 and extending upwardly and rearwardly at an angle as clearly shown in FIGS. 1 and 2.

Figure 6:
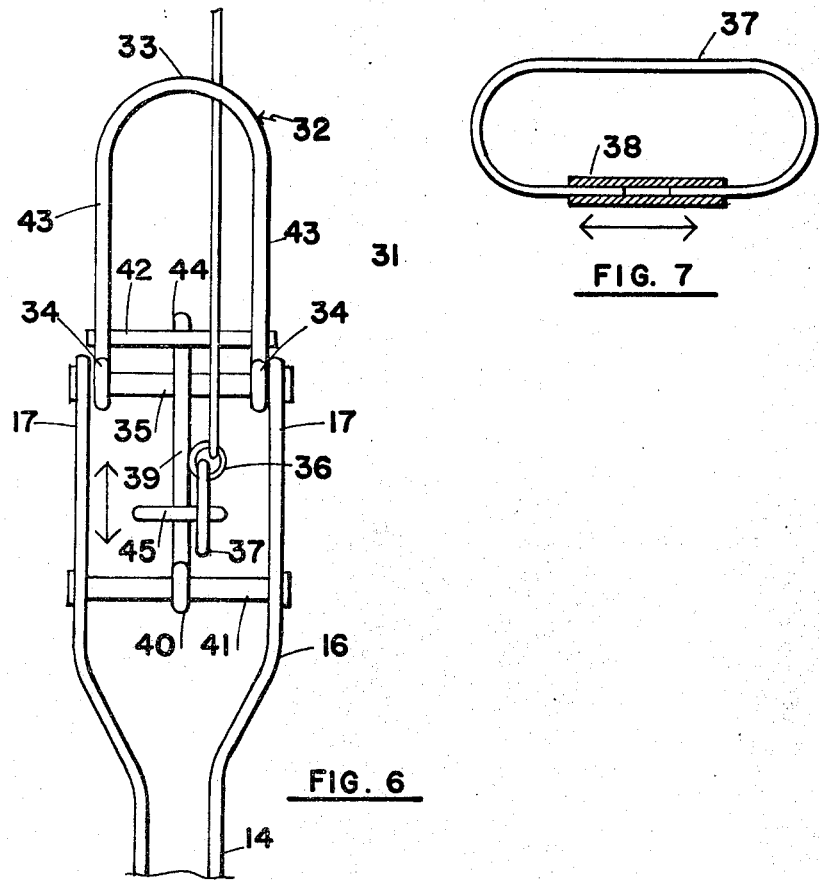
FIG. 6 is a view at right angles to FIG. 5.

A stationary member 14 is welded to the strips 11 adjacent the other ends 15 thereof and this stationary member extends upwardly and forwardly from the frame members 11 as clearly illustrated in FIGS. 1 and 2 and the upper end 16 of this stationary member 14 is bifurcated as shown in FIG. 6 thus providing a pair of spaced and parallel arms 17 as clearly shown.

Gussets 18 may be welded between the part 12 and the strips 11 and between the stationary member 14 and the strips 11 as shown, in order to strengthen the structure.

A movable member 19 is provided and is pivoted by the lower end thereof upon a pivot pin 20 extending across the strips 11 intermediate the ends thereof and this movable member extends upwardly in the same plane as the stationary member 14 as clearly illustrated.

Dealing first with the embodiment shown in FIGS. 1 and 2, a tension spring 21 is secured by one end thereof to the portion 12 which is provided with a lug 22 thereon.

A rod 23 is secured to the movable member 19 intermediate the ends thereof and is situated in spaced and parallel relationship therefrom, being welded by the angulated ends 24, to the member 19. The other end of spring 21 is provided with a loop 25 which freely engages around rod 23 and may be slid therealong.

When in the released position shown in FIG. 2, the ring 25 of the spring is towards the upper end of the rod 23 and in order to set the trap, this ring is moved manually downwardly towards the lower end of rod 23 thus reducing the leverage and enabling the member 19 to be moved over to the set position shown in FIG. 1. As soon as the trap is released as will hereinafter be described, the spring 21 pulls the member 19 in the direction of arrow 26 and as it passes over top-dead-center, the ring slides up rod 23 thus increasing the leverage action of the spring 21 upon the member 19.

A snare wire collectively designated 27 is provided and consists of a sliding loop portion 28 and an attaching portion 29 with a ring or the like 30 being secured to the end of the loop portion 28 through which the attaching portion 29 extends so that when the attaching portion is pulled, the loop will tighten in the conventional manner.

The attaching portion 29 extends through a trigger assembly collectively designated 31 and is operatively attached adjacent the upper end of the movable member 19 so that when the trap is sprung, the loop is tightened as illustrated.

Figure 5:
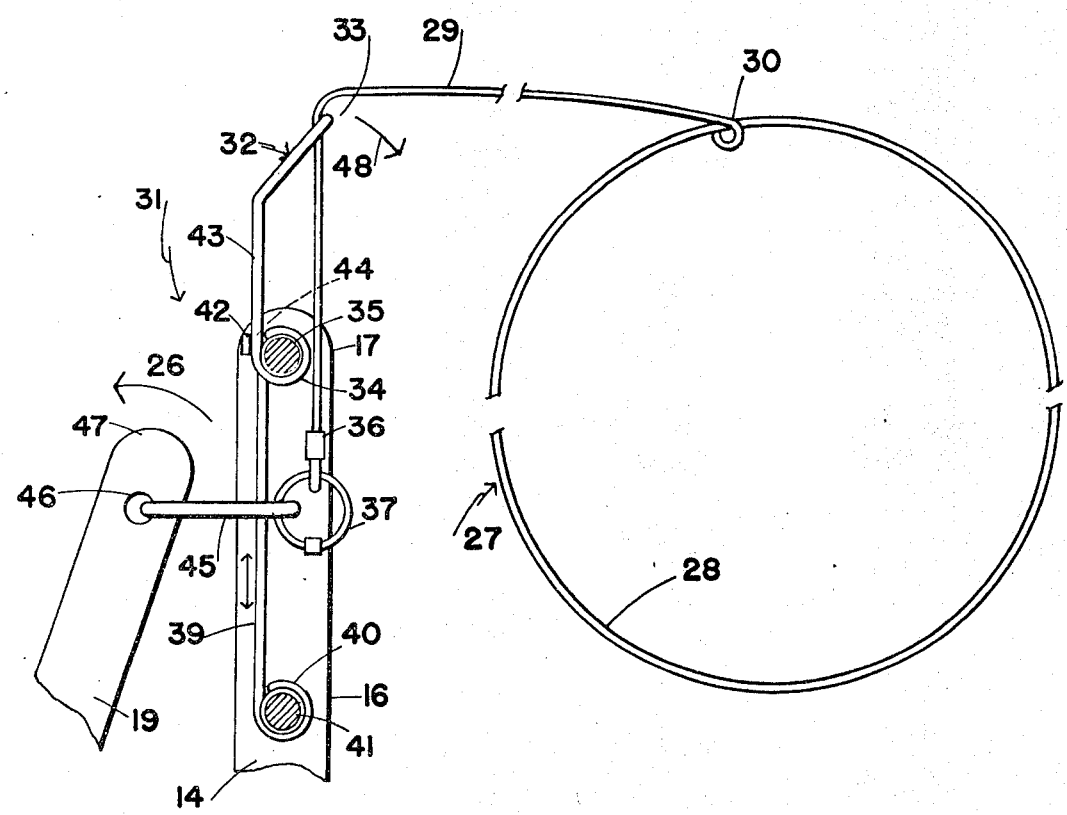
FIG. 5 is a fragmentary partially sectioned side elevation of the trigger mechanism enlarged with respect to the remaining drawings.

The trigger assembly is shown in detail in FIGS. 5 and 6 and includes an actuator collectively designated 32 which consists of a wire member having a closed upper end 33 and bearing loops 34 being formed on the lower ends which extend freely around a pivot pin 35 extending between the upper ends of the bifurcated portions 17 of the fixed member 14.

Figure 7:
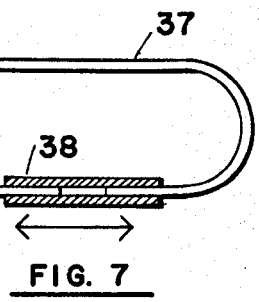
FIG. 7 is an enlarged side elevation showing the sliding ring attachment for the snare wire.

When viewed in side elevation, this actuator is angulated at the upper ends thereof and the attaching portion 29 of the snare wire extends over the upper end 33 and through the loop formed by the acutator and terminates in a looped end 36 which freely engages in an attaching ring 37. This attaching ring 37 is of the split type as shown in FIG. 7 and includes the sliding sleeve 38 which, when moved to one side, enables the snare wire to be attached and detached readily and easily when desired.

A trigger lever 39 consists of a rod or the like having a loop 40 formed on the lower end thereof which freely engages around a further pivot or cross pin 41 extending between the bifurcated ends 17 of the fixed member 14 but spaced below the aforementioned pivot pin 35.

Trigger lever retaining means are provided taking the form of a cross bar 42 secured to the side portions 43 of the actuator adjacent the looped ends 34 and when in the set position shown in FIGS. 5 and 6, the distal end 44 of the trigger lever engages this cross bar with the actuator in the position illustrated.

Release means 45 is provided and takes the form of a closed ring or loop pivoted through an aperture 46 adjacent the upper end 47 of the movable portion or member 19 and this loop 45 extends freely around the trigger lever 39 as shown, with the split ring 37 freely engaging within the loop 45 so that the attaching end 29 of the snare wire is effectively secured to the upper end of the movable member 19.

The tension of spring 21 biassing the movable member 19 in the direction of arrow 26, pulls the trigger lever against the cross bar 42 of the actuator and maintains the actuator in the position illustrated in FIGS. 5 and 6.

However, as soon as an animal engages the snare loop 28, the attaching portion is, of course, pulled slightly thus moving the actuator in the direction of arrow 48 which pivots the actuator around the pin 35 thus disengaging the cross bar 42 from the distal end 44 of the trigger lever 39. This permits the spring 21 to snap the movable member 19 to the position shown in FIG. 2 thus pulling the loop portion 28 of the snare wire to a closed position because this attaching portion 29 extends through the actuator 32 and under the cross bar 42 when in the sprung position. This is shown in FIG. 2.

The release means or loop 45 can be moved manually up and down the trigger lever 39 thus controlling the tension required to release the trigger means. In other words, if the closed loop 45 is moved towards the lower end of the trigger lever 39, when the trap is set, relatively low tension on the snare wire will release the trap but if the loop 45 is moved upwardly towards the distal end of the trigger lever when the trap is set, then a greater tension is applied to the trigger lever by the spring 21 thus requiring more tension to release the trigger assembly.

As mentioned previously, by sliding the ring 25 of the spring 21 towards the lower end of the rod 23, the movable member 19 can be moved manually towards the set position and the trigger assembly can be engaged. However, when the trap is sprung, the full force and leverage of the spring 21 is applied to the movable member 19 because the ring 25 slides towards the upper end of the rod 23 as clearly shown in FIG. 2.

Figure 4:
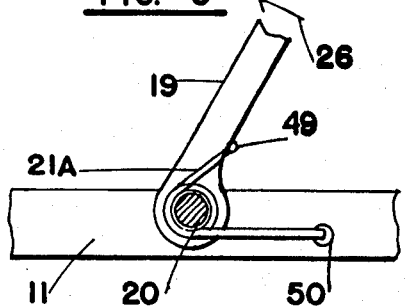
FIG. 4 is a partial fragmentary side elevation of part of the frame and movable lever showing an alternate embodiment.

FIG. 4 shows an alternative spring arrangement in which a coiled hairpin spring 21A is provided to supply the action to the movable member 19. One end engages in front of the movable member as indicated by reference character 49 and the coils of the hairpin spring extend around the pivot 20 and engage by the other end, through an aperture 50 within one of the strips 11 as clearly shown.

The trap can be rested against a tree, can be supported by means of packed snow, or can be supported by means of a stick or nail illustrated in phantom by reference character 51, engaging the ground between the two strips 11 all of which depend of course, upon the circumstances.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A snare type animal trap including a snare wire having a sliding loop portion and an attaching portion extending from said sliding loop portion; comprising in combination a supporting frame, a stationary member extending from said supporting frame, a movable member pivoted by one end thereof to said supporting frame and extending therefrom in the same plane as said stationary member, a detachable trigger assembly operatively connecting the upper end of said stationary member and said movable member, and spring means normally urging the upper end of said movable member away from said stationary member, the attaching portion of the associated snare wire being secured to said upper end of said movable member and operatively engaging said trigger assembly, said spring means comprising a tension spring extending between said movable member and said supporting frame, and means to attach said spring by one end thereof to said movable member, said last mentioned means including a rod secured to said movable member in substantially spaced and parallel relationship therewith and a loop on said one end of said spring engaging around said rod and being slidable therealong thereby varying the leverage of said spring upon said movable member.

2. The trap according to claim 1 which includes means to pivotally mount said movable member to said supporting frame, said spring means including a coil spring engaging around said last mentioned means and reacting between said movable member and said supporting frame.

3. The trap according to claim 2 in which said trigger assembly includes an actuator pivotally secured adjacent the upper end of said stationary member, said attaching portion of the associated snare wire freely engaging through said actuator, a trigger lever pivoted by one end thereof to said stationary member below said acutator, a trigger lever retainer means on said actuator, the distal end of said trigger lever engaging behind said retainer means when said trigger assembly is in the set postion, and release means connected adjacent the upper end of said movable member and freely engaging around said trigger lever when in the set position whereby the pressure of said spring means maintains said distal end of said trigger lever against said retainer means on said actuator, the attaching portion of the associated snare wire being connected to said release means.

4. The trap according to claim 3 in which said release means takes the form of a closed loop pivotally connected to said movable lever and freely surrounding said trigger lever, said closed loop being manually positionable along the length of said trigger lever for controlling the force of said spring means acting upon said trigger lever and thereby controlling the release tension of said trigger assembly.

5. The trap according to claim 1 in which said trigger assembly includes an actuator pivotally secured adjacent the upper end of said stationary member, said attaching portion of the associated snare wire freely engaging through said actuator, a trigger lever pivoted by one end thereof to said stationary member below said actuator, a trigger lever retainer means on said actuator, the distal end of said trigger lever engaging behind said retainer means when said trigger assembly is in the set position, and release means connected adjacent the upper end of said movable member and freely engaging around said trigger lever when in the set position whereby the pressure of said spring means maintains said distal end of said trigger lever against said retainer means on said actuator, the attaching portion of the associated snare wire being connected to said release means.

6. The trap according to claim 5 in which said release means takes the form of a closed loop pivotally connected to said movable lever and freely surrounding said trigger lever, said closed loop being manually positionable along the length of said trigger lever for controlling the force of said spring means acting upon said trigger lever and thereby controlling the release tension of said trigger assembly.

* * * * *